United States Patent [19]
Wright

[11] Patent Number: 5,390,024
[45] Date of Patent: Feb. 14, 1995

[54] OPTICAL TRANSFORM GENERATING APPARATUS

[76] Inventor: Steven Wright, c/o Wright Cotttage, Mackerye End, Harpenden, Hertfordshire, Great Britain, AL5 5DR

[21] Appl. No.: 170,981

[22] Filed: Dec. 21, 1993

Related U.S. Application Data

[63] Continuation of Ser. No. 928,423, Aug. 13, 1992, abandoned.

[30] Foreign Application Priority Data

Aug. 13, 1991 [GB] United Kingdom ............... 9117443

[51] Int. Cl.$^6$ ................................................ G01B 11/00
[52] U.S. Cl. ........................................ 356/376; 356/2
[58] Field of Search .................................. 356/2, 376

[56] References Cited

U.S. PATENT DOCUMENTS

| | | | |
|---|---|---|---|
| 4,114,037 | 9/1978 | Westwood | 250/216 |
| 4,412,741 | 11/1983 | Stein | 356/1 |
| 4,459,003 | 7/1984 | Kagechika | |

FOREIGN PATENT DOCUMENTS

| | | |
|---|---|---|
| 057584 | 8/1982 | European Pat. Off. |
| 2147762 | 5/1985 | United Kingdom |
| 2197765 | 5/1988 | United Kingdom |
| 2209900 | 5/1989 | United Kingdom |

OTHER PUBLICATIONS

S. Wright, "Hough transform analysis of data from a planar array of image sensor", Image & Vision Computing, vol. 5, No. 2 May 1987, pp. 121–126.

Robert Bolles et al., "Epipolar–Plane Image Analysis: A Technique for Analyzing Motion Sequences", IEEE, Oct. 1985 pp. 168–178.

*Primary Examiner*—F. L. Evans
*Attorney, Agent, or Firm*—Cushman, Darby & Cushman

[57] ABSTRACT

The formation of Epipolar (or orthogonal) images from linear sections of a two-dimensional scene image in order to build up a depth map of the scene image using Hough transform techniques presently requires a spaced array of image sensors or scanning movement of a single sensor and then electronic processing of the image signals. Herein, optical radiation from a linear section of a scene image passed to deflector means, for example an elongate helical reflector, which deflects the radiation in dependence upon displacement along the section so as to form an array of side by side images of the linear scene image section as soon from different points therealong. Instead of single helical reflector, the deflector means could comprise a series of mirrors set at different angles or an array of Dove prisms which each act to rotate the linear image it receives.

9 Claims, 3 Drawing Sheets

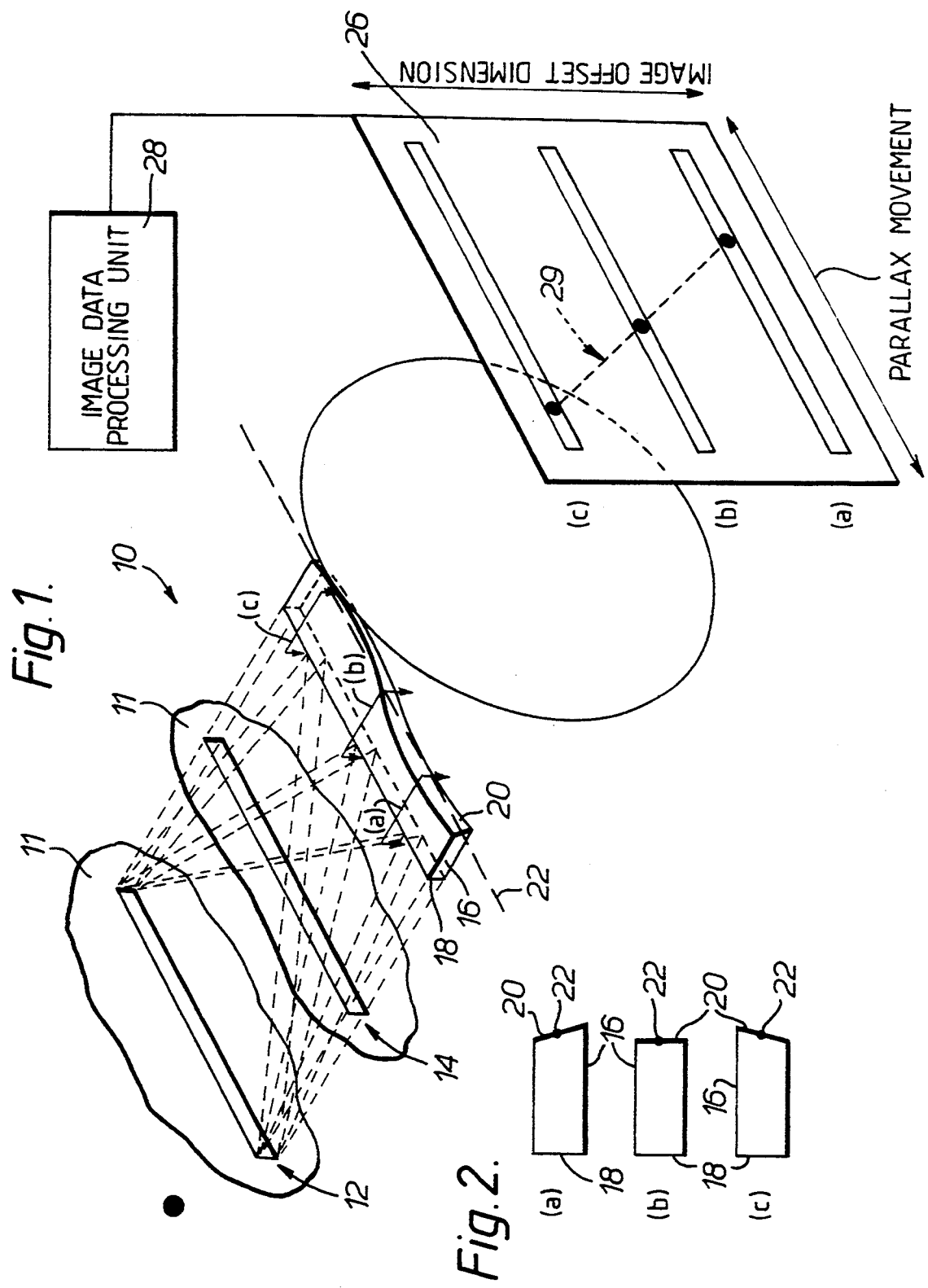

OPTICAL TRANSFORM GENERATING APPARATUS

This is a continuation of application Ser. No. 07/928,423, filed on Aug. 13, 1992, which was abandoned upon the filing hereof.

This invention relates to apparatus for optically generating an epipolar image transform of a viewed scene, and to optical depth map generators and rangefinders incorporating such apparatus.

It is known that a depth map or range picture of a viewed scene can be derived by observing the viewed scene through a linear array of cameras parallel to the image plane and comparing the parallax displacement of selected features in the viewed scene between adjacent images. In a conventional stereo analysis, features are identified in each individual camera image and the motion of these features between images is tracked to establish the magnitude of the parallax offsets.

It is known from Bolles, R. C. and Baker, H. H. "Epipolar plane image analysis: a technique for analyzing motion sequences" Proc 3rd IEEE Workshop Computer Vision Representation and Control (1985), that the sequence of images resulting from camera motion (or the series of images from a fixed linear array of cameras) can be considered as a three-dimensional data solid with two spatial dimensions and one temporal. The three-dimensional data solid can be thought of as a solid built up by stacking the successive two-dimensional images together. Bolles and Baker show that this data solid can be sectioned orthogonally to the image plane and parallel to the lateral camera motion (or axis of the linear array) to give a set of images with one spatial dimension and one temporal dimension. In the case of a fixed linear array of cameras the temporal dimension is replaced by the linear camera offset. The image thus obtained is known as an Epipolar image (or orthogonal image). This technique is discussed further in the paper "Hough Transform Analysis of Data from Planar Array of Image Sensors"; (Image and Vision Computing; Vol 5; No. 2; May 1987, by Wright, S. the present inventor). As described in this paper an epipolar image can be generated by rotating a block of refractive plastics material, namely the material known by the trademark "Perspex" in the line of sight of a TV camera to provide a varying offset and the video signals from the camera are then processed electronically. From the Epipolar image, the depth or range information can be developed using a process known as Hough Transform Analysis. This helps avoid some of the disadvantages of the conventional stereo analysis approach, in particular the quite difficult task of correlating features of successive images of the viewed scene.

A problem common to both the conventional process and the process using Epipolar images, is the need for a relatively expensive array of cameras, a camera arranged for accurate controlled movement or a mechanical scanning arrangement in conjunction with electronic image manipulation as just outlined, and one object of the invention is to provide optical apparatus which can perform transformation to an Epipolar image without these items.

Accordingly, in one aspect this invention provides apparatus for optically generating at an output plane an Epipolar image transform of a viewed scene, said apparatus including a line of sight, a parallax axis orthogonal to said line of sight, means for selecting a linear slice of said viewed scene as seen from a plurality of offset viewing points along said parallax axis and elongate deflector means extending generally parallel with said parallax axis for having said selected slice incident thereon, said elongate deflector means forming corresponding respective offset images thereof as seen from said plurality of offset viewing points and mapping said images towards or onto a respective portion of an output image plane in accordance with the offset of the associated viewing point.

The term "offset image" is used to mean that the images of the slice of the viewed scene are taken from offset viewpoints so that, for any features other than those at "infinity", there will be a displacement due to parallax in successive images. The amount of movement between successive images is inversely proportional to the range of the feature.

The elongate deflector means may take many forms. It may be a series of deflector portions arranged to deflect the incident image through an angle dependent on the offset, i.e. the axial position of the portion along the deflector means. The deflector portions may be separate portions or, more preferably, they may comprise an integral continuous array. The deflector portions may be refractive e.g. prisms or diffractive. If diffractive it may be necessary to use a narrow band filter on the incoming light to avoid distortion due to wavelength effects.

Where the deflector portions comprise a continuous array they will form a continuous image at the output plane.

In one arrangement, the output deflections imposed on the offset images by the elongate deflector means are converted into lateral displacements relative to the optical axis by positioning a lens to receive the deflected light and to focus it onto an image plane.

In an alternative embodiment, the elongate deflector means is made up of a series of deflector elements arranged to rotate the image slice through a preset angle, preferably 90°. The deflector elements may comprise a series of discrete prisms arranged side by side to rotate and stack said offset images to form a composite image at the output plane.

The invention also extends to an optical rangefinder incorporating the apparatus as defined above.

Furthermore it also extends to an optical mapping device for receiving a selected plane or slice of a viewed scene and forming respective offset images thereof and assembling said images at an output plane side-by-side in accordance with said offset.

Whilst the invention has been described above, it includes any inventive combination of the features set out above or in the following description.

The invention may be performed in various ways and two embodiments thereof will now be described in detail, with reference to the accompanying drawings, in which:

FIG. 1 is a schematic view of a first embodiment of range-finding apparatus in accordance with the invention;

FIGS. 2(a) to (c) are successive sections along the length of the helically-faced prism of FIG. 1;

Figure 3:
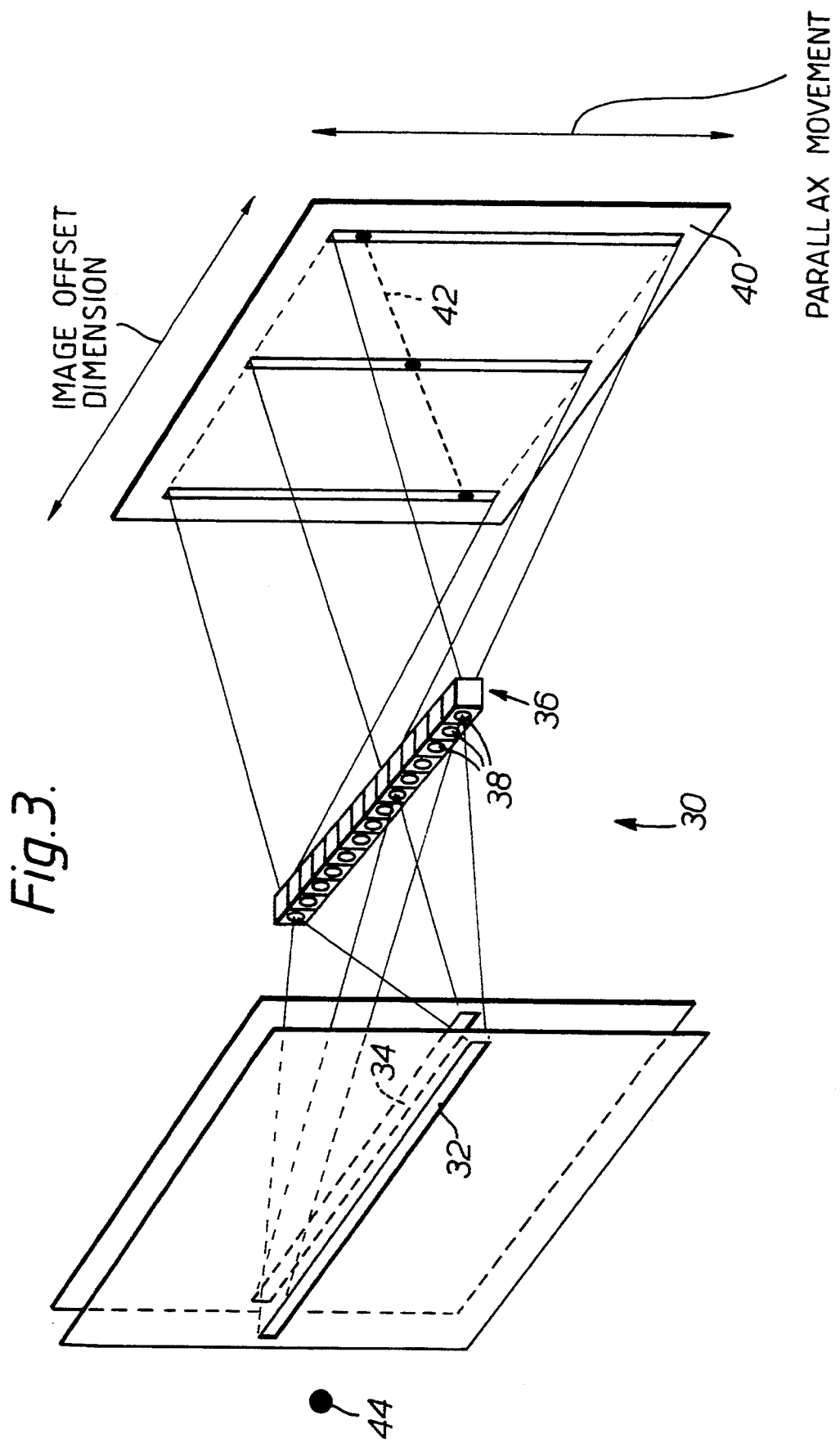
FIG. 3 is a detailed view of apparatus for optically generating an epipolar image for use in a second embodiment rangefinder in accordance with the invention.

Referring to FIGS. 1 and 2, the first embodiment of optical rangefinder 10 comprises screens 11 defining a pair of parallel spaced horizontal slits 12 and 14 which admit light only from a narrow elongate horizontal portion of the viewed scene. This light becomes incident on an elongate prism 16 having a plane front surface 18 and a rear surface 20 of helical form about a helical axis 22, as shown by FIGS. 2(a) to 2(c). Light passing through the elongate prism 16 is collected by a lens 24 and focussed on an output image plane which is coincident with a detector 26. The output from the detector is passed to an image data processing unit 28 which determines the range of feature points distinguishable in the viewed slice by Hough Analysis Techniques or other processing techniques which monitor parallax movement of a given feature as a function of camera offset to calculate the range of the feature.

The function of the elongate prism 16 is best understood by considering its behaviour at a series of spaced sections e.g. as shown in FIGS. 2(a) to 2(c). Each section will view the image slice transmitted through the slits 12, 14 from a different offset viewpoint, marked (a), (b), (c) respectively, dependent on the axial position of the section along the length of the prism 16. Likewise each section will deflect the particular offset image through a given angle of magnitude dependent on the angle of the rear surface 20 of the prism or the section. As the rear surface is helical, the angle of the rear surface of the prism is also dependent on the axial position of the section and so the elongate prism defines a continuous series of elements each taking an offset image of the viewed slice and deflecting it through an angle of magnitude dependent on the offset of the image.

The lens 20 receives parallel light from each section but at different angles dependent on the offset. The lens 20 converts these angles into lateral displacements at the image plane and so the offset images are stacked up at the image plane in order of increasing offset, as indicated schematically at (a), (b) and (c) in FIG. 1. The prism is continuous rather than made up of discrete images, and FIG. 2 is for explanation only. The elongate prism in this example is made by casting from a suitable optical resin. The helix angle is set dependent on the aspect ratio required at the output image plane.

The elongate prism produces an epipolar image of the viewed slice at the output image plane. This will consists of "parallax" lines 29 each indicating the parallax movement of a feature point in the viewed scene as a function of the image offset. The gradient of the parallax line can be determined to calculate the range of the feature point and the position of the feature point relative to a datum is also determinable thus allowing range estimates for any feature points on the selected image slice. The apparatus thus constitutes a linescan range sensor and it may include means for scanning the sensor across a viewed scene to generate a full two-dimensional range picture or depth map of the viewed scene.

Figure 4:
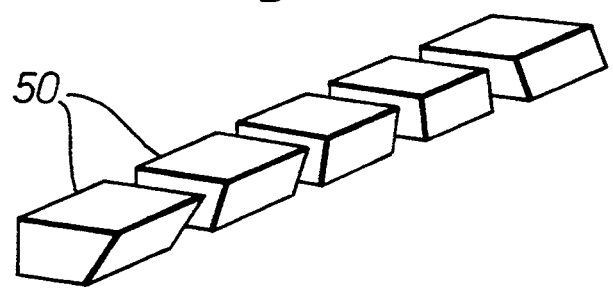
FIG. 4 is an elongated prism made up of discrete elements.

Instead of being continuous, the elongate prism may be made up of discrete elements 50 having different face angles as shown in FIG. 4. Also, other deflecting elements could be used, for example elements that operate by diffracting or reflecting light instead of refracting it.

FIG. 3 shows a detail of a second embodiment of an optical rangefinder 30. A parallel spaced pair of horizontal slits 32, 34 select a slice of the viewed scene as before and present it to an elongate array 36 of Dove prisms 38 each with an associated lens. Each Dove prism 38 takes a respective offset image of the selected slice, rotates it through 90° about the optical axis and projects it onto an output image plane 40. At the image plane, the images of the slice are stacked up in order of increasing offset as determined by the axial position of the particular prism along the array 36. As in the earlier embodiment the Epipolar image at plane 40 will consist of "parallax" lines 42 indicating apparent movement of a feature 44 between adjacent images as a function of image offset. The range of the feature lines can be determined as in the first embodiment.

Figure 5:
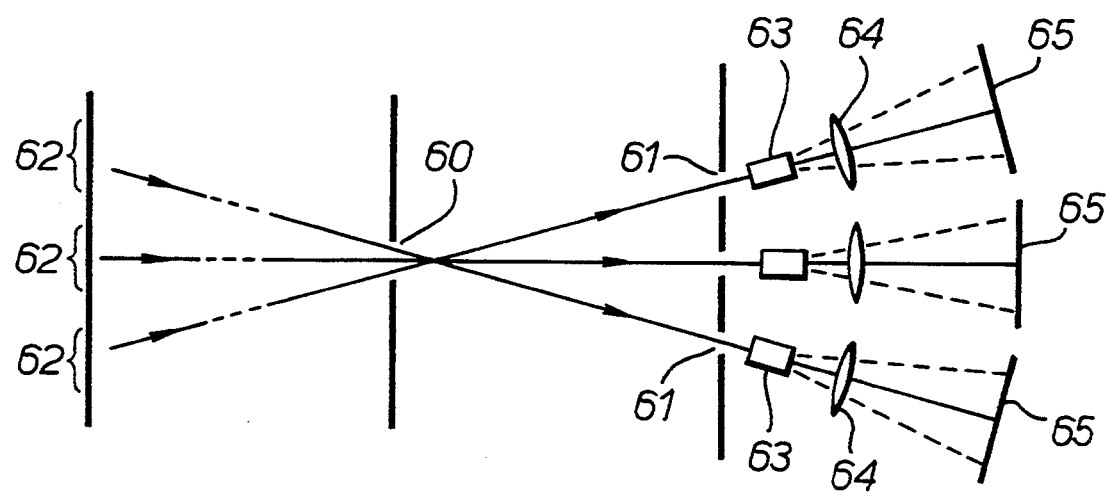
FIG. 5 is a schematic view of an embodiment for providing range finding over a full viewed scene.

The above embodiments may be modified to provide range finding over the full viewed scene instead of just a slice. This may be achieved by stacking several of the devices previously described one on top of the other. Alternatively, as shown in FIG. 5, the apparatus may comprise a single slit 60, for example a horizontal slit behind which is grouped a vertical array of parallel horizontal slits 61. Each of these selects a corresponding one of a vertical series of image slices 62 and presents it to a respective elongate deflector 63 and lens 64. There is thus formed a whole series of epipolar images 65 of respective linear sections of the viewed scene.

I claim:

1. Apparatus for optically generating at an output plane an Epipolar transform of a viewed scene, said apparatus including a line of sight, a parallax axis orthogonal to said line of sight, means for selecting a linear slice of said viewed scene as seen from a plurality of offset viewing points along said parallax axis and elongate deflector means extending generally parallel with said parallax axis for having said selected slice incident thereon, said elongate deflector means forming corresponding respective offset images thereof as seen from said plurality of offset viewing points and mapping said images towards or onto a respective portion of an output image plane in accordance with the offset of the associated viewing point.

2. Apparatus according to claim 1, wherein said elongate deflector means comprises a discrete or continuous array of deflector portions arranged to deflect the respective image through a preset angle in accordance with the offset thereof.

3. Apparatus according to claim 2, wherein said elongate deflector means comprises an elongate prism or array of prisms arranged to deflect the respective image through an angle in accordance with the offset thereof.

4. Apparatus according to claim 3, wherein said prism or array of prisms define a generally planar front face and a rear face with a generally helical contour about a helical axis parallel to said front face.

5. Apparatus according to claim 2, including lens means for receiving light deflected by said elongate deflector means and arranged to convert the deflection angle into a lateral displacement at the image plane.

6. Apparatus according to claim 3, wherein said elongate prism is substantially continuous with a planar front surface and a continuous rear surface.

7. Apparatus according to claim 1, wherein said elongate deflecting means comprises an elongate array of deflector elements each arranged to rotate the image of the plane or slice through a common preset angle to define said transform.

8. Apparatus according to claim 7, wherein each deflector element is a prism.

9. Apparatus according to claim 1 and processing means connected to the apparatus for processing the image at the said output plane to determine the range of given feature points in the selected image slice.

* * * * *